(12) United States Patent
Johnson et al.

(10) Patent No.: US 7,337,603 B2
(45) Date of Patent: Mar. 4, 2008

(54) ROUND BALER LEAF RECLAMATION DEVICE

(75) Inventors: Aaron J. Johnson, Jamestown, ND (US); Reuben D. Morlock, Jamestown, ND (US); Patrick D. Bennett, Jamestown, ND (US)

(73) Assignee: DuraTech Industries International, Inc., Jamestown, ND (US)

( * ) Notice: Subject to any disclaimer, the term of this patent is extended or adjusted under 35 U.S.C. 154(b) by 348 days.

(21) Appl. No.: 11/055,463

(22) Filed: Feb. 10, 2005

(65) Prior Publication Data
US 2005/0198935 A1 Sep. 15, 2005

Related U.S. Application Data

(63) Continuation-in-part of application No. 10/799,261, filed on Mar. 12, 2004, now abandoned.

(51) Int. Cl.
*A01D 43/02* (2006.01)

(52) U.S. Cl. .................................................... 56/341

(58) Field of Classification Search ............ 100/87–89; 56/341, 364
See application file for complete search history.

(56) References Cited

U.S. PATENT DOCUMENTS

| | | | |
|---|---|---|---|
| 3,722,197 A | 3/1973 | Vermeer | 56/341 |
| 3,914,926 A | 10/1975 | Braunberger et al. | 56/341 |
| 4,065,914 A | 1/1978 | Phillips et al. | 56/341 |
| 4,178,944 A | 12/1979 | Hanaway | 130/27 R |
| 4,292,981 A | 10/1981 | De Busscher et al. | 130/27 F |
| 4,306,494 A | 12/1981 | Nishibe et al. | 100/5 |
| 4,441,513 A | 4/1984 | Herwig | 130/27 B |
| 4,534,285 A | 8/1985 | Underhill | 100/88 |
| 4,765,237 A | 8/1988 | Vansteelant et al. | 100/89 |
| 4,771,595 A | 9/1988 | Jennings | 56/341 |
| 4,870,812 A | 10/1989 | Jennings et al. | 56/341 |
| 4,899,651 A | 2/1990 | Lausch et al. | 100/87 |
| 5,228,280 A | 7/1993 | Ratzlaff et al. | 56/341 |
| 5,255,501 A | 10/1993 | McWilliams | 56/341 |
| 5,365,836 A | 11/1994 | Campbell | 100/5 |
| 5,419,253 A | 5/1995 | Campbell | 100/3 |
| 5,479,767 A | 1/1996 | McClure et al. | 56/343 |
| 5,941,168 A | 8/1999 | Kluver et al. | 100/87 |
| 6,098,391 A | 8/2000 | Underhill | 56/341 |
| 6,170,245 B1 | 1/2001 | Underhill | 56/341 |
| 6,601,375 B1 | 8/2003 | Grahl et al. | 56/16.6 |
| 6,729,118 B2 | 5/2004 | Viaud | 56/341 |

*Primary Examiner*—Thomas B. Will
*Assistant Examiner*—Alicia Torres
(74) *Attorney, Agent, or Firm*—Westman, Champlin & Kelly, P.A.

(57) ABSTRACT

A material reclaiming device is positioned below the bale forming of a round baler. The bale forming belts are spaced apart. The reclaiming device underlies a region to the bale chamber to catch material falling through the spaces between the bale forming belts and move the material forwardly, to be recycled or reclaimed into the in-feed region of the baler. A trough is provided under an in-feed drum to receive the material from the reclaiming device and cause such material to be carried with the incoming material into the bale forming chamber.

17 Claims, 10 Drawing Sheets

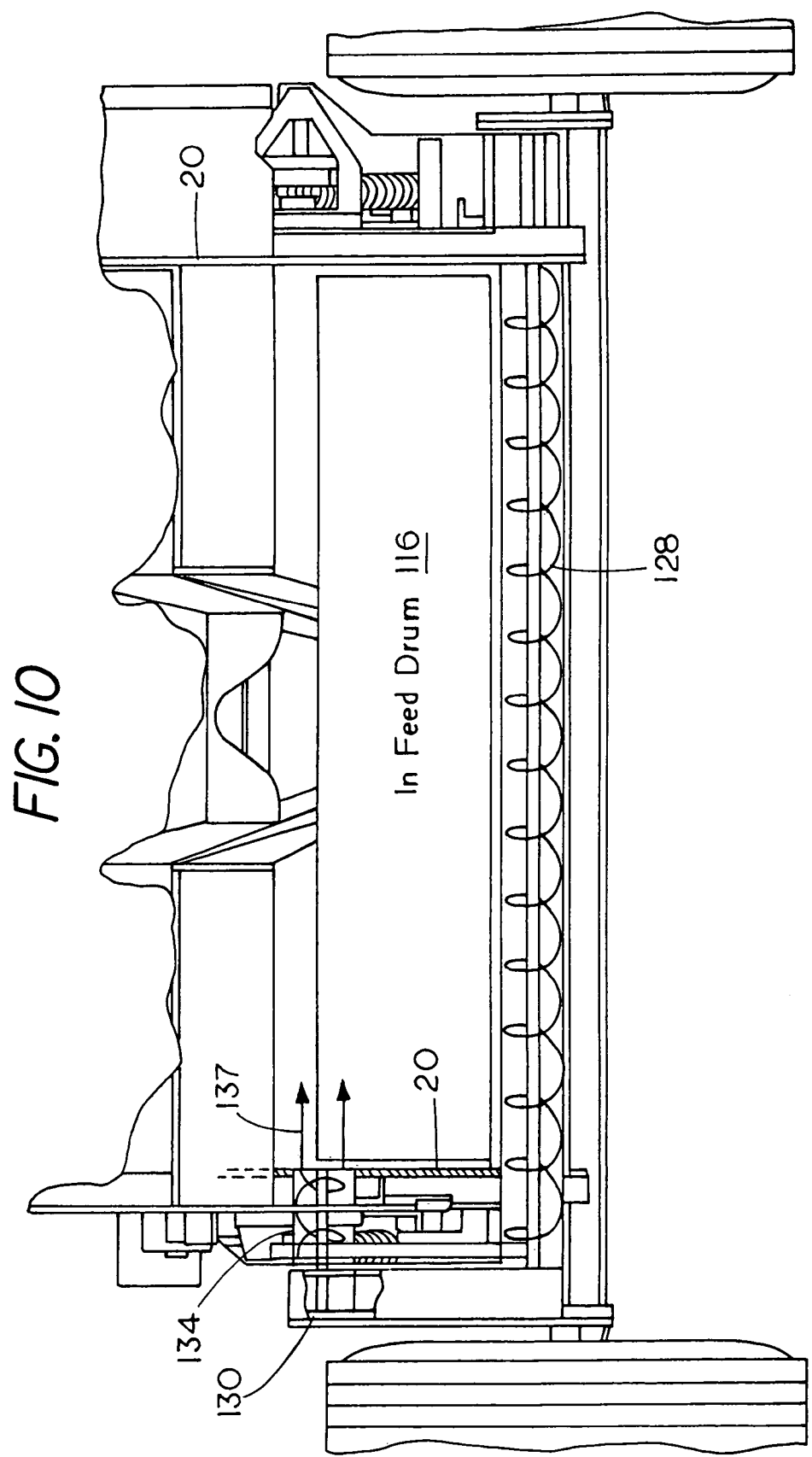

ROUND BALER LEAF RECLAMATION DEVICE

CROSS REFERENCE TO RELATED APPLICATIONS

This patent application is a continuation-in-part of U.S. patent application Ser. No. 10/799,261, filed Mar. 12, 2004 now abandonded, and priority is hereby claimed and application Ser. No. 10/799,261 is incorporated by reference.

BACKGROUND OF THE INVENTION

The present invention relates generally to "round balers" which form cylindrical bales of crop material, and more particularly, to a reclamation device that is mounted below the bale forming chamber to recover leaves and short stems that have been torn from the crop being baled, and which drops through gaps or openings, to return such high nutrient components to be recycled into the baled material.

Round balers are widely used at the present time, and, generally utilize a series of belts that accept a swath or windrow of hay crop from a pick up and in feed roller or drum feed system. The hay is fed into the baler chamber, and as a bale starts to form in the inlet throat of the baler, that is, between a starter roller and a support drum, the belts or rollers will tend to tear off leaves and short stems in high quality hay crops such as alfalfa. The leaves and stems that are torn off will fall between the openings in the series of side by side belts used commonly for forming the round bale, or other gaps and thus will be lost.

It is well known that the leaves, in particular, are high in the digestive nutrients in a hay crop such as alfalfa, and so loss of such high quality components is detrimental.

The reclamation device is designed primarily for use with a round baler that utilizes a series of bale forming belts that are positioned side by side and that have spaces between the side by side belts, particularly in the region where hay is being fed into the bale chamber.

Prior art round balers are shown in U.S. Pat. Nos. 4,899,651; 4,870,812; 5,444,969; and 6,098,391. A round baler which uses rolls for forming the bales is shown in U.S. Pat. No. 4,765,237.

SUMMARY OF THE INVENTION

The present invention relates to a reclamation device or system that catches materials that are dropped or dislodged from crop material as the crop material enters the baling chamber of a round baler and returns the material to the baler in feed for recycling into a bale being formed. The reclaiming of the crop material is accomplished by utilizing a return feed conveyor, as shown, a belt or belts below the in-feed such as guides or in a preferred forms of a round baler.

The reclamation device is operable whenever the baler is operated. Suitable conveyors are used in one form of the invention. The bale forming belts act to move material along a guide wall back to the material in-feed.

The reclamation device receives crop materials that drop through gaps in the bale forming belts or rollers and the dropped crop material is moved or guided back toward the in-feed region of the baler. The reclaimed material may be fed into a trough below a rotating feeder drum which transfers material from the trough into the baler in-feed region. The leaves and short stems returned to the in-feed region will be picked up and carried with incoming crop material, such as hay, and mixed in and retained in the incoming windrow of material, and thus retained in the bale being formed.

The reclaiming device of the present invention is mounted on the baler frame. The reclaiming device will extend transversely to the baler and transversely to the direction of movement of the bale forming belts.

In a preferred form of a belt conveyor underneath the bail forming belts, conveyor mounting rollers are parallel to the axis of the bale being formed. The belt conveyor is preferably formed as a self-contained assembly of a frame, belt rollers and a belt mounted over the belt rollers.

The belt conveyor can have a selected fore and aft length but generally is of sufficient length to underlie the entire in-feed area of a baler where the feed drums and rollers engage the incoming hay and tend to shatter or tear the leaves and small tender stems from the main plant stems.

The surface of the belts on the belt conveyor can be smooth or have irregularities, as desired. The drive to the belt rollers onto the other conveyors disclosed can be chain or belt drives from driven rollers on the baler, or can be hydraulic motor utilized for driving the conveyors.

A single endless belt that extends the full width of the baler is preferred to reduce or prevent any materials that are deposited on the top surface of the belt from falling through onto the ground.

The reclaiming device provides a saving of high quality portions of the hay or other crop materials, which increases the food value of the baled material, thus benefiting a cattle feeding operation.

BRIEF DESCRIPTION OF THE DRAWINGS

FIG. 10 is a fragmentary front view of FIG. 9, with parts broken away to show the cross angles.

DETAILED DESCRIPTION OF THE PREFERRED EMBODIMENTS

Figure 1:
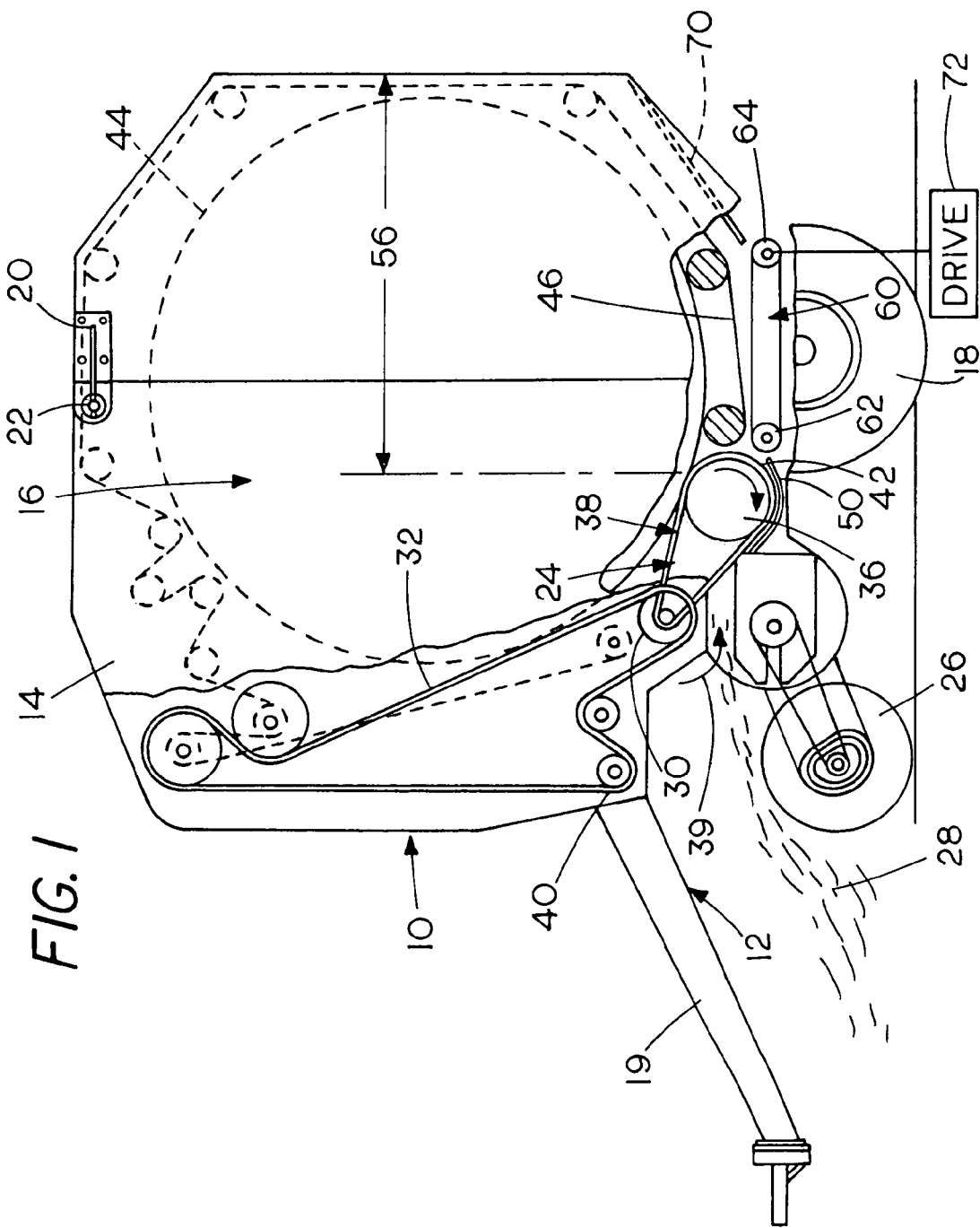
FIG. 1 is a side schematic view of a typical round baler with the bale forming chamber illustrated only schematically.

A baler 10 which is a "round" baler has a main frame 12 that is made up of a number of interconnected structural elements. The baler frame 12 has side walls 14, and has an expandable bale chamber defined partially by a dotted representation of a round bale inside an apron 44 that forms the bale. Expandable bale chamber 16 is in the center portions of the baler. The frame 12 and side walls 14 are supported on wheels 18, and a tongue 19 is used for connecting the baler to a tractor.

The baler includes a tailgate section 20 that is closed during bale formation, as shown in FIG. 1, but is hinged to the front portion of the baler at the top of the wall 14, and can be opened so the bottom of the tailgate swings out to drop a bale onto the ground after the bale is formed. The tailgate 20 is pivoted to the side frame for the walls 14 on pivot shafts 22 at the top, and is open and closed with hydraulic cylinders in a conventional manner.

The bale forming chamber has a hay inlet indicated generally at 24, which receives incoming hay from a pick up 26 that engages a window or swath of hay (crop material) on the ground and which transports the swath upwardly over the pick up. The hay swath is represented at 28 schematically, and is moved across suitable guides into the inlet 24.

A bale starter roller that is illustrated at 30 is rotatably mounted on the side walls 14 and is driven in a suitable manner, as shown schematically with a chain drive 32, and rotates in direction as indicated by the arrow 34 to urge hay from the hay swath or source 28 into the bale chamber through the inlet or throat 24. A support drum 36 is also suitably driven with a chain 38 that is represented only in dotted lines.

Figure 2:
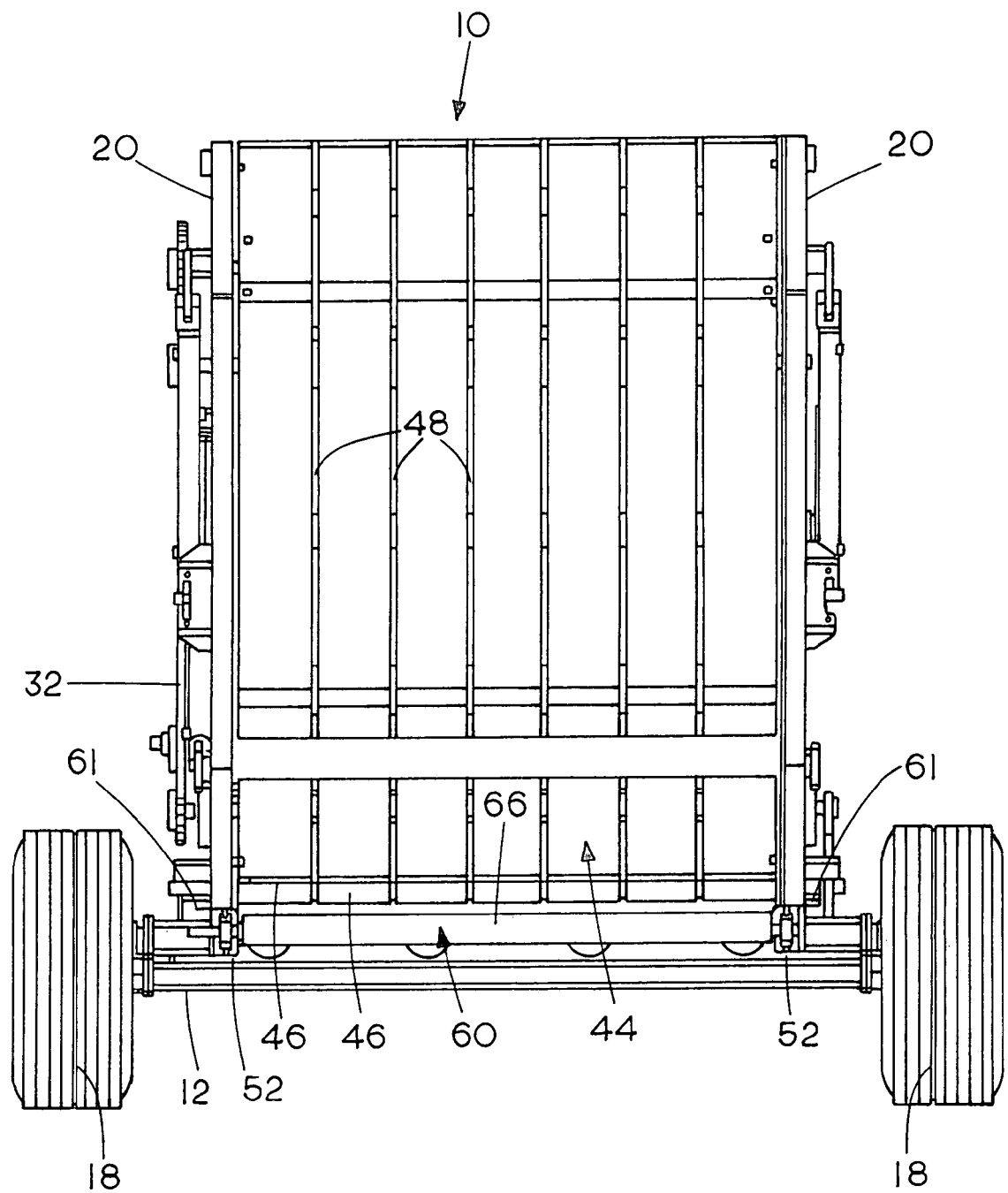
FIG. 2 is a rear view of the baler of FIG. 1.
Figure 3:
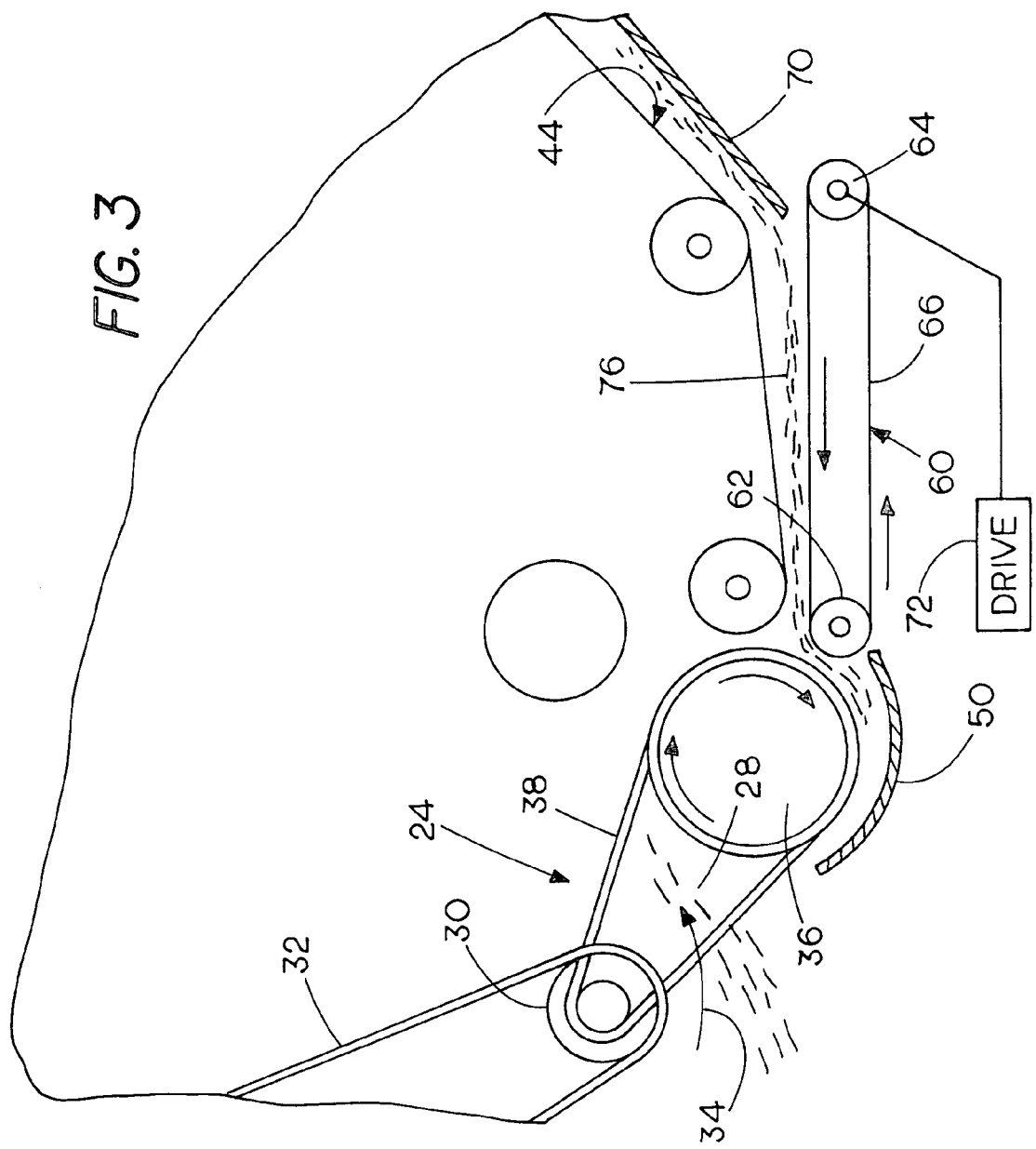
FIG. 3 is a schematic representation of a reclaiming belt assembly made according to the present invention installed in lower portions of a baler, below the in-feed region where crop material enters the bale chamber.

It should be noted that a power take off connection 40 can be used for driving the baler components, or suitable hydraulic motors can be utilized for drivers as well. The support drum 36 is rotated in a direction as indicated by the arrow 42, to urge the hay into the bale forming chamber. The bale forming chamber is conventional, and is further defined by the apron 44, which in FIG. 1 surrounds the bale that is formed. As can be seen in FIG. 2, the bale forming apron 44 is made up of a plurality of side by side belts 46, mounted on suitable transversely extending drive rollers and guide rollers, in a conventional manner.

The bale forming belts 46, as can be seen are spaced apart with slot like openings 48 between the bale forming belts. The openings are large enough to permit passage of leaves or short stems through the slots. In the throat area 24, the starter roller 30 and the support drum 36 can strip, jar or vibrate leaves and short stems off the hay plant main stalks, and these leaves and short stems will drop through the openings 48 between the bale forming belts 46 of the apron that forms the bale.

Figure 5:
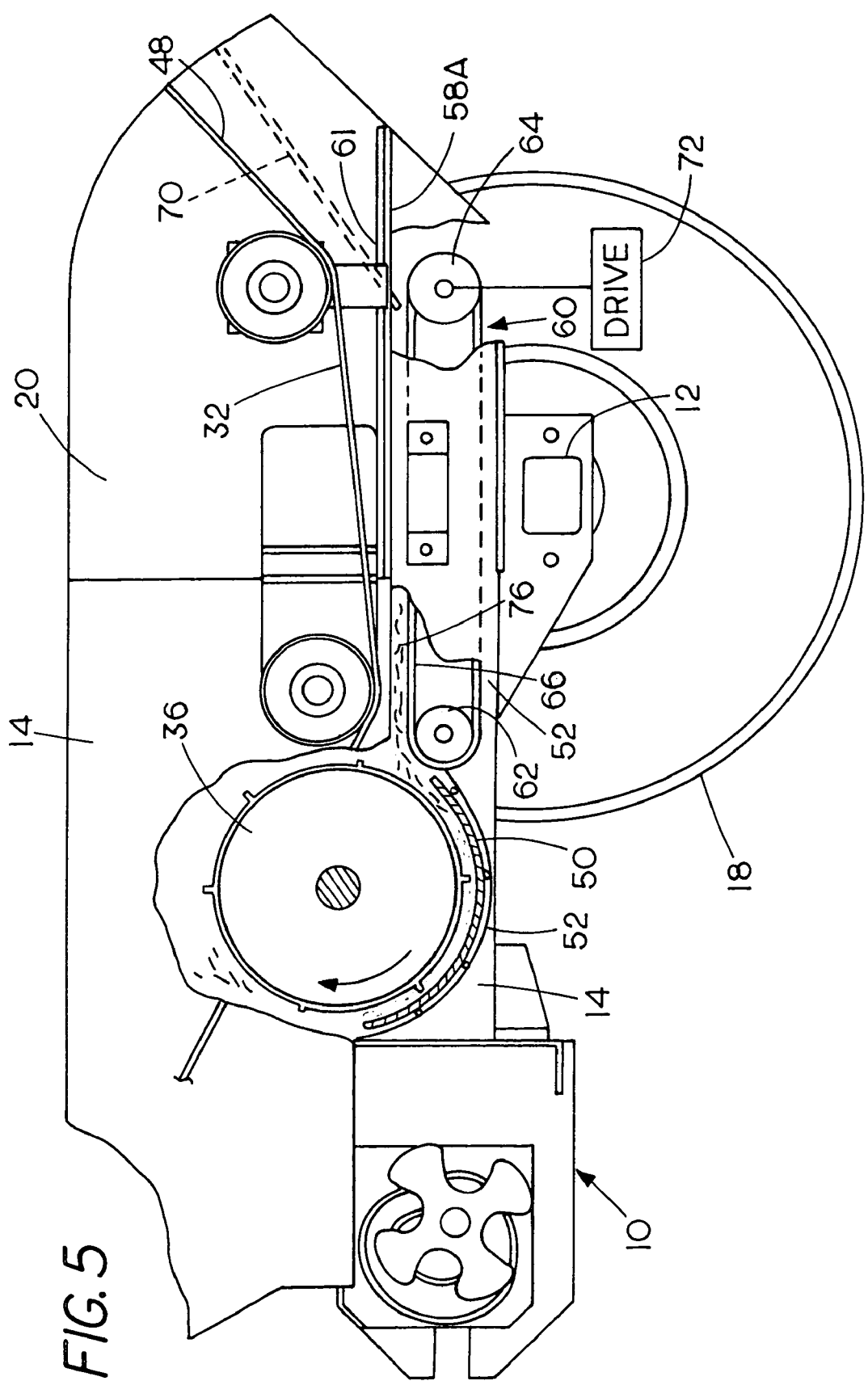
FIG. 5 is an enlarged fragmentary side view of a reclaiming conveyor installed on a baler.

In order to provide for a recovery of such leaves, short stems and other materials that drop through the slots 48, a first form of the reclamation device of the present invention includes a trough 50 that is part cylindrical, and spaced below the lower portions of the support drum 36. The trough 50 is fastened using suitable side flange members 52 as perhaps best seen in FIG. 5. The trough 50 extends laterally along the entire length of the support drum 36 between side walls 14. The trough 50 is imperforate, and it will catch and hold material that is deposited in the trough, which is then returned to the bale chamber by drum 36.

It can be seen that the main region for shattering, stripping, and dropping leaves is to the rear side of the drum 36, spanning the lower side of the entire bale forming region all the way to the rear wall of the tailgate, represented generally by the double arrow 56 (FIG. 1). In this region, the majority of the loose leaves and the like would be dropped, and to reclaim these leaves a reclaiming belt conveyor assembly indicated generally at 60 is supported on the side walls 14 of the baler. The conveyor assembly is preferably a self-contained conveyor or belt assembly having a frame 57 that include longitudinal side frame member 58 held together with cross members shown at 59 (FIG. 6).

Figure 4:
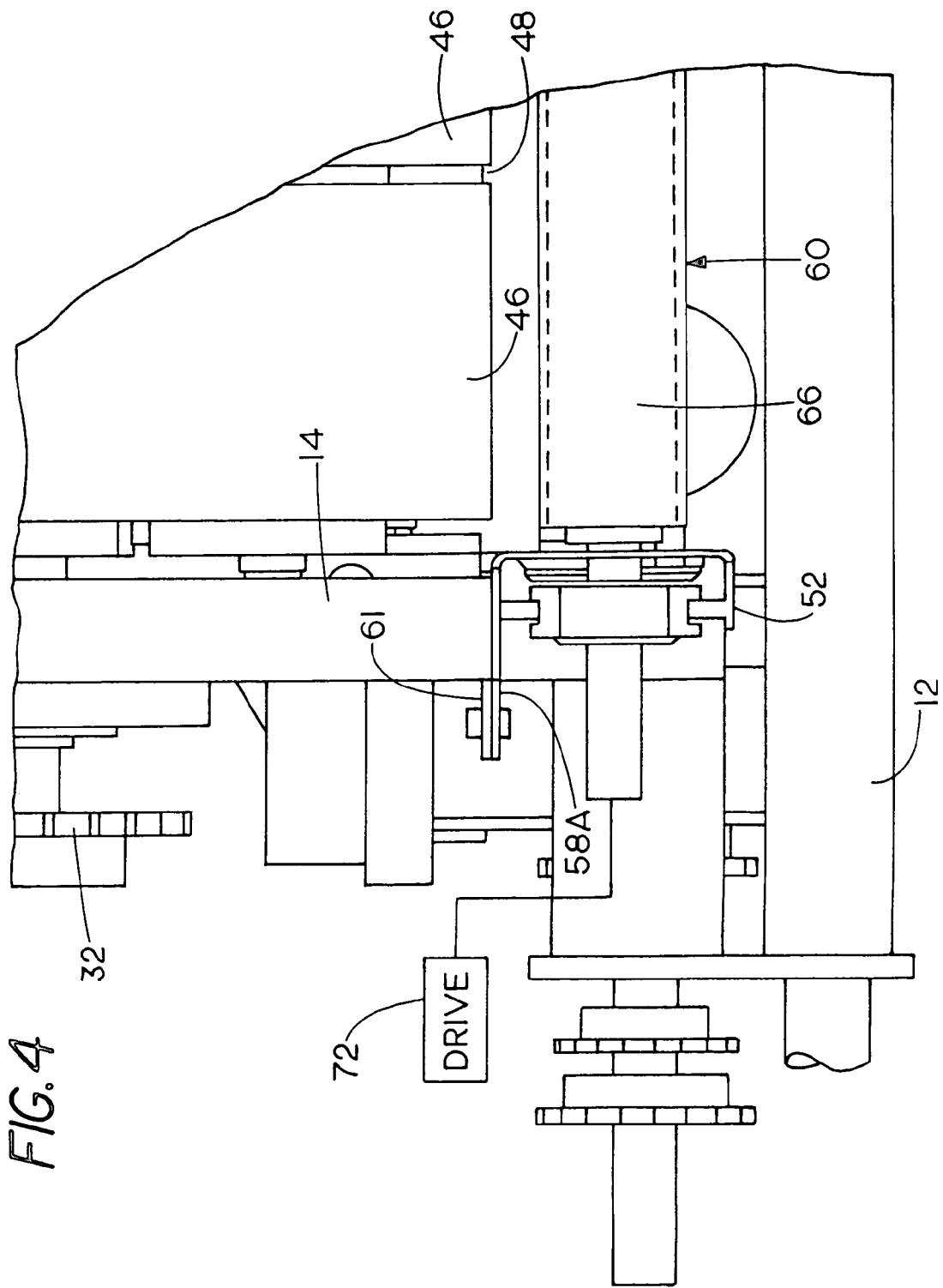
FIG. 4 is an enlarged rear view of one side of the reclaiming belt of the present invention showing the position of the frame of the baler.
Figure 6:
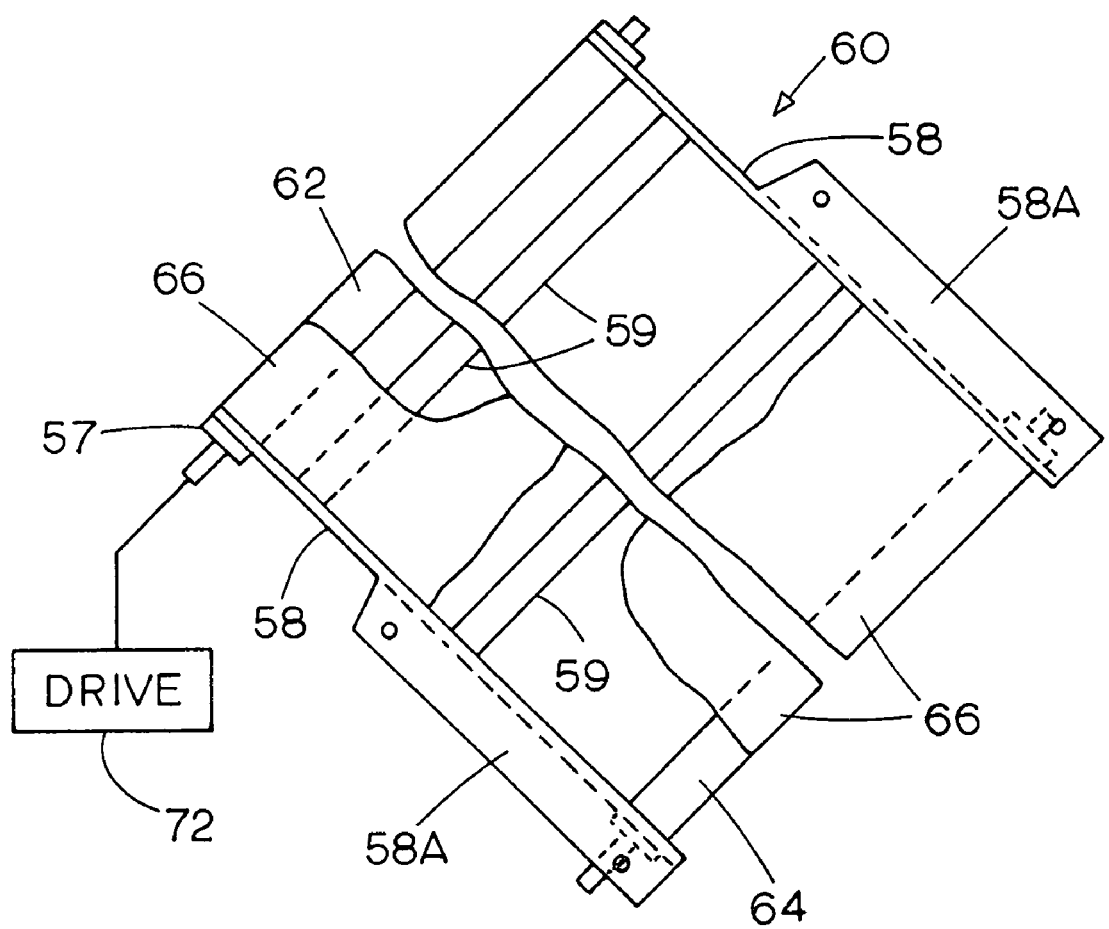
FIG. 6 is a perspective view of a reclaiming conveyor assembly.

End belt support rollers 62 and 64, respectively, are rotatably supported on the side frame members 58, as can be seen in FIGS. 2, 4, and 6. The conveyor belt support rollers 62 and 64 carry a solid surface (imperforate) full width belt 66. This is preferably a continuous belt surface across the width of the baler.

The tailgate has an inclined bottom wall 70 that catch materials dropping through rear portions of the tailgate. The wall 70 is inclined sufficiently so the material slides down onto the top of the reclaiming belt 66 and the material is then returned to the trough 50.

The reclaiming conveyor assembly 60 is suitably powered by driving front roller 62. The conveyor assembly is held in place by fasteners from flanges or supports 61 on the tail gate 20 that support flanges 58A on the conveyor frame members 58. The conveyor assembly 60 thus moves with the tail gate when it pivots rearwardly as a formed bale is dropped. The conveyor drive is represented only schematically at 72, because it can be any desired type of drive which will move with the tail gate.

The conveyor belt 66 moves so that the top length of the conveyor belt 66 is moving forwardly toward the trough 50, and it will deposit loose crop materials on the top of the belt, such as leaves and stems indicated at 76, into the trough 50. The loose crop material will be carried around the support drum 36 and into the flow of hay (the windrow or swath 28) coming into the inlet or throat region 24. The reclaimed leaves and stems will be mixed in with the hay swath or windrow, and will then be processed and held in place in the formed bale.

The fore and aft length of the conveyor assembly 60 can be selected to be as desired, and the drive speed can also be selected to accomplish the purposes of returning the dropped materials 76 that have fallen through the openings 48 between the bale forming belts 46 (or other openings in balers using rolls for bale forming) onto sloping wall 70 and onto the conveyor assembly 60 and into the trough 50 for re-processing.

Again, the types of drives for the conveyor assembly 60 can be as desired. The position of the conveyor assembly 60 on a round baler having a plurality of side by side belts that are spaced to form gaps, is below the general crop material inlet area of the baler where the greatest losses of the highly nutritious leaves of crop plant such as alfalfa occur. Sloping or tapering walls such as wall 70 can be used to aid in returning materials to the conveyor.

Figure 7:
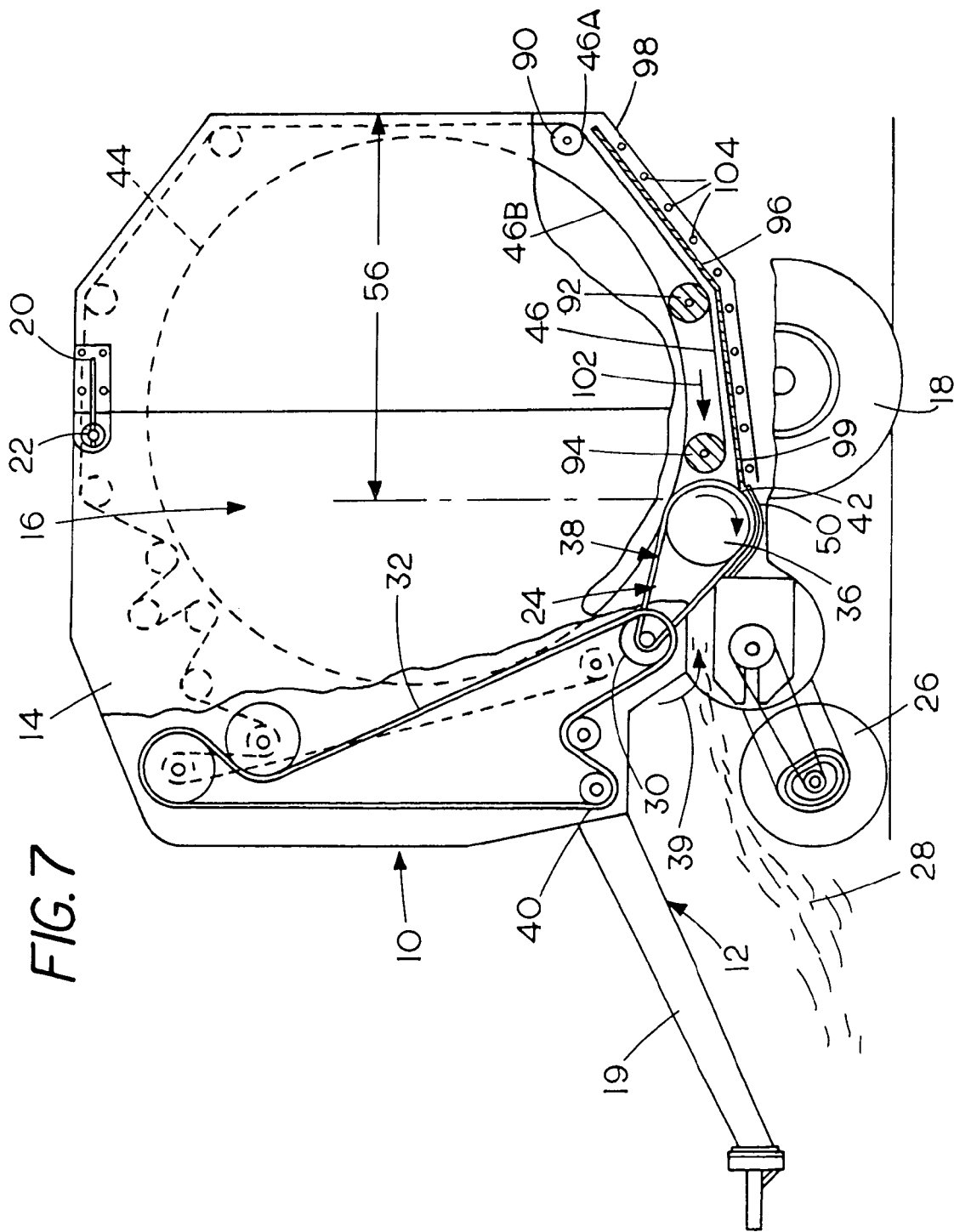
FIG. 7 is a side view similar to FIG. 1 with a second form of reclamation device shown thereon.
Figure 8:
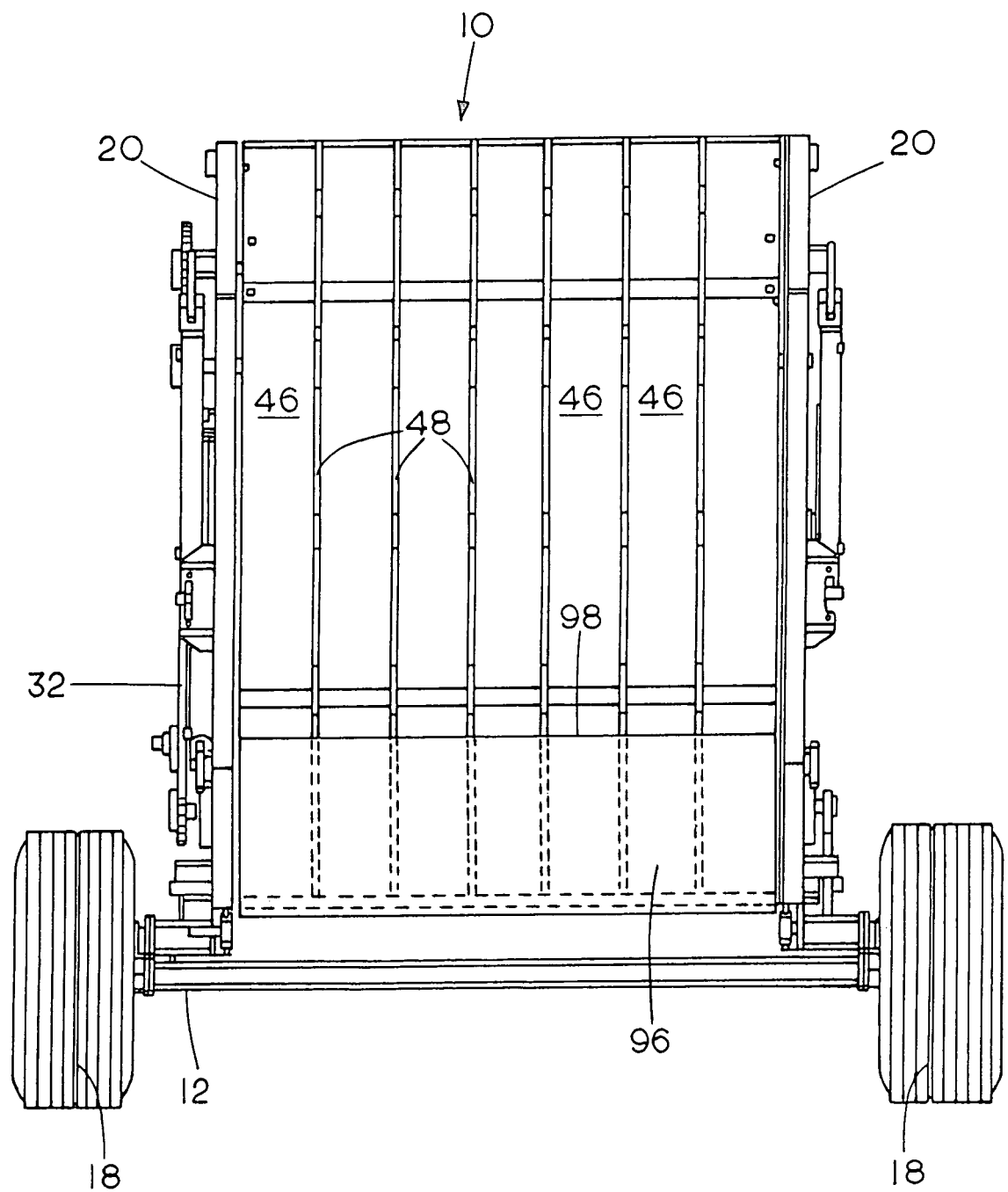
FIG. 8 is a schematic rear view of the baler of FIG. 7 with the discharge door removed.

A second form of a crop material reclaiming device of the present invention is shown in FIGS. 7 and 8, which utilizes a return slide panel for conveying leaves and shattered stems and the like that would drop through the bale forming back to the baler in feed section belts. In this form of the invention, the basic bale support and forming chamber is made as previously explained, but the bale forming belts 46 shown in somewhat greater detail. Each belt 46, includes a belt section 46A that is guided by guide rollers 90, 92, and 94, and the belt 46 turn back upon itself and belt sections 46B are engaged by incoming material forming the bale. The belts are wrapped around the roller 94 for forming the return portion 46B. This configuration of bale forming belts is shown, for example, in U.S. Pat. No. 4,870,812, where the bale that is being formed moves the belts to wrap around a roller such as that shown at 94.

The infeed arrangement is the same as previously explained, including the crop material support drum 36 and the trough 50 that receives material being fed into the bale forming chamber. The belts 46 are driven as previously explained, but in this form of the invention, the side panels 20 of the baler or frame are used for supporting a cross panel or plate, which is an imperforate (solid) plate 96 that is formed to follow the contour of the belt section 46A from the rear edge portion 98 of the panel adjacent the baler tailgate, to a location 96 where the end 99 of panel 96 overlies an edge of the trough 50.

The panel 96 is very closely spaced from the belt section 46A, which is moving as indicated by arrow 102, so that the belt section 46A will engage any accumulation of material that falls onto the panel 96 and move it in the direction as indicated by the arrow 102. The material that drops through spaces 48 will be moved to the end 99 of the panel 96 and dropped off the panel 96 into the trough 50. The material in trough 50 is then fed with the roller 36 into the bale forming chamber for recycling, as previously explained with the reclaiming conveyor system 60.

The panel 96 can be formed in any desired manner and fastened, for example, with suitable fasteners 104 to the side panels or walls 20 of the baler. The panel 96 extends all the way across the baler as shown in FIG. 8 so that any material falling from the openings 48 between the belts 46 will fall onto panel 96 and will be moved by gravity or conveyed by the belt sections or lengths 46A into the trough 50. Panel 96 is an extension of the return wall 70 on the tailgate shown in FIG. 1, and is mounted on the tailgate so when the tailgate is opened to eject a formed bale, the panel 96 moves with the tailgate. If desired, a portion of panel 96 can be mounted on and can follow or move with the tailgate. The panel 96 could then be made in two sections. The tailgate also can be formed to provide clearance for the panel 96, if desired.

Figure 9:
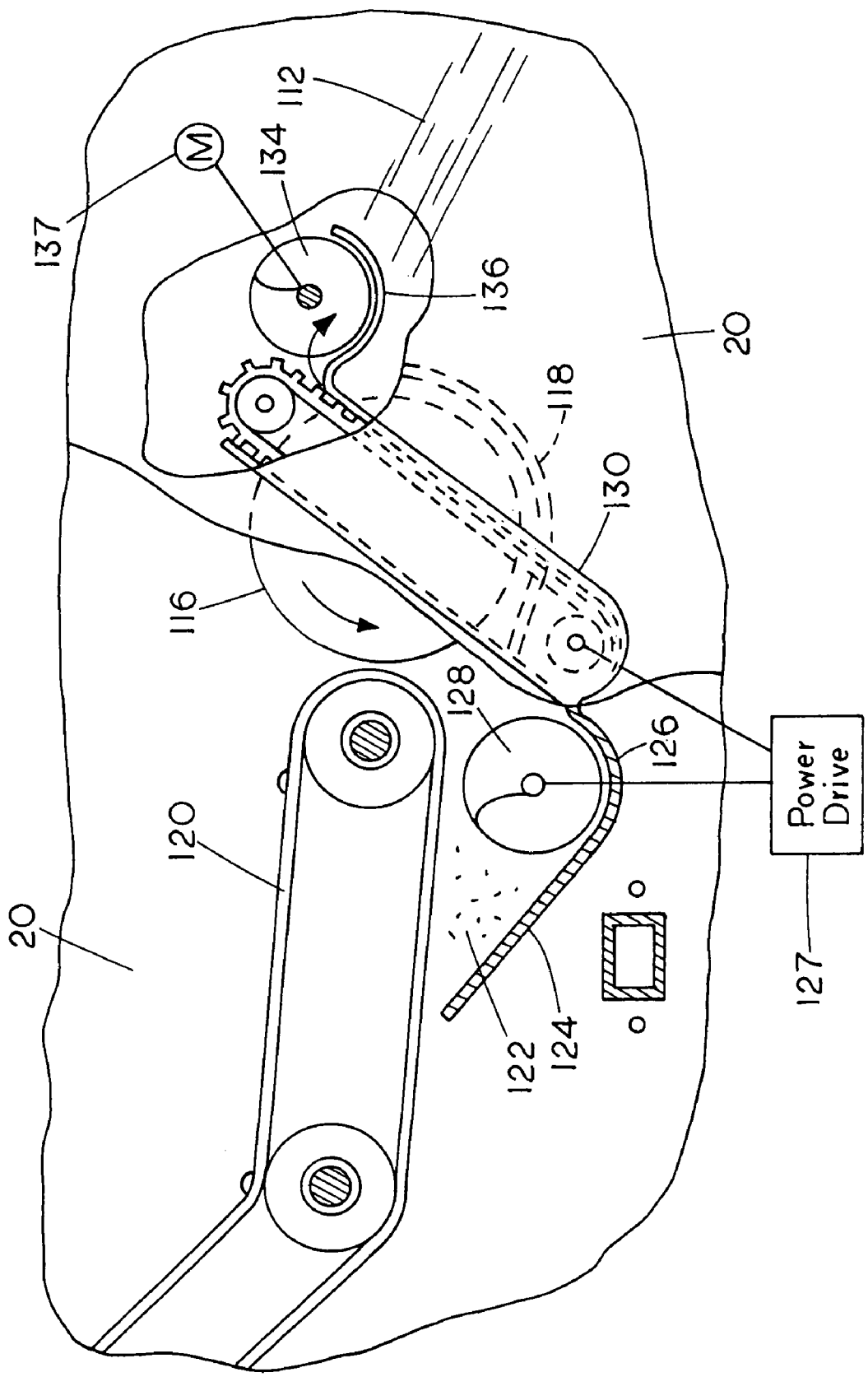
FIG. 9 is an enlarged fragmentary side sectional view of a further modified reclamation device for a baler.

FIGS. 9 and 10 are schematic showings of a further modified form of a device for reclaiming loose leaves and other stems and plant materials. In this form the invention a right side view of a section of the in-feed region of the baler is shown. The view is of the opposite side of the baler shown in FIG. 5. The in-feed of crop material is shown at 112 from the pickup to the in-feed material support or feed drum 116, which serves the same function as the drum 36. Drum 116 is supported relative to the baler frame and side walls 20, in a usual manner and rotates relative to a trough 118.

Crop material being fed from the pick up flows to the feed drum and enters the bale forming chamber where the material is engaged by bale forming belts 120. The belts 120 are mounted on rollers and are spaced laterally apart as shown in the previous form of the invention for the belts 46. The belts 120 are used for forming a round bale in the normal manner.

The leaves and stem material that drops through the space between the belts, which is indicated generally at 122, is guided by and slides material down a conveyor input panel 124 that extends across the entire width of the baler. The panel 124 a base portion 126 that is formed to be part cylindrical to form a trough for operate with a powered cross auger 128, that extends all the way across the baler (See FIG. 10). The auger is powered from a drive 127 to move material dropping through the bale forming belts to one side of the baler and to the outer side of the side panel 20 of the baler. The material that is being reclaimed is deposited by the conveyor auger 128 onto a base end of a return conveyor assembly 130 that will convey the material up to a level above the in-feed stream 112 of crop material, and deposit the reclaimed material into a trough 136 for a cross auger 134. The cross auger 134 can be flush or nearly flush with the inside surface of side panel 20. The infeed material 112 will sweep past the cross auger opening inside panel 20 and mix in reclaimed material 37.

The conveyor 130 may be a chain and paddle conveyor as used for tailings return conveyors on combines, as shown, for example, in U.S. Pat. No. 4,178,944. is on the exterior of the baler side panel 20, as shown in FIG. 10. The auger 134 can be rotated with a motor 137 or a suitable chain or belt drive. Trough 136 can be a tube on the exterior of the baler and open on the interior of the baler. The auger 136 conveys the reclaimed material back into the baler through the opening in the side wall 20 of the baler and deposits the reclaimed material 137 into the in-feed stream 112.

The conveyor system shown in FIGS. 9 and 10 recycles the loose leaves, stems and other crop material that has fallen through the openings between the baler belts, and in this way will provide for reclaiming the crop material that otherwise would be lost.

All of the reclamation devices of the present invention gather the loose material falling from the bale forming chamber so it is returned and deposited into the inlet stream of crop to be baled. The crop material that is feeding into the bale chamber forms a bed as it flows into the baler.

The schematic showing in FIG. 10 illustrates the conveyor 130 to the exterior of the side of the baler. Conveyor 130 acts as crop material return for returning the material into the in flow of the crop material to be baled. The conveyor 130 is schematically shown as a chain or belt and paddle conveyor driven with power drive 127, but it also can be an auger conveyor.

Although the present invention has been described with reference to preferred embodiments, workers skilled in the art will recognize that changes may be made in form and detail without departing from the spirit and scope of the invention.

What is claimed is:

1. In a baler forming a crop material into a cylindrical bale and including a mainframe, a bale forming chamber comprising a bale chamber having a plurality of bale forming members, and an in-feed region including a rotating drum for urging crop material over a top of the drum and into the bale chamber to be formed into a bale by the bale forming members, the improvement comprising a material return device underlying the bale forming members, said material return device receiving reclaimable crop material passing through gaps in the bale forming members, a trough underlying the rotating drum and including structure operable to guide reclaimable crop material engaging the structure to the rotating drum to be carried by the rotating drum with crop material into the bale chamber.

2. The baler improvement of claim 1 wherein said material return device has portions extending across a lateral width of the baler.

3. The baler improvement of claim 1 wherein the bale forming members comprise a plurality of side by side belts having spaces between adjacent belts.

4. The baler improvement of claim 3 wherein the material return device includes a movable belt portion for moving reclaimable crop material back to the in-feed region.

5. The baler improvement of claim 4 wherein the movable member comprises a conveyor.

6. The baler improvement of claim 5 wherein the conveyor comprises a belt conveyor including a forward roller extending between fore and aft extending frame members, and a rear roller on the frame members positioned parallel to the forward roller, and an endless belt mounted over the forward and rear rollers.

7. The baler improvement of claim 6 and a power drive to drive one of the forward and rear rollers.

8. The baler improvement of claim 6 wherein the baler has a tail gate hinged at a top and pivotal to open a bottom to remove a bale, the conveyor being mounted on the tail gate.

9. The baler improvement of claim 5 and a trough for recovery of material carried on the conveyor, a drum cooperating with the trough to move material from the trough to the in-feed region of the baler.

10. The reclaiming conveyor of claim 9 wherein the conveyor is a belt conveyor comprising an endless belt mounted on a frame having fore and aft extending side frame members, a pair of rollers rotatably mounted on the frame, and cross members between the side frame members.

11. The reclaiming conveyor of claim 10 wherein the endless belt comprises a continuous belt that extends across the width of the bale forming chamber and is positioned so the material dropping through the spaces between the side by side belts is dropped onto an upper length of the endless belt, and a drive to move the upper length toward the trough.

12. In a baler forming a crop material into a cylindrical bale and including a mainframe, a bale forming chamber comprising a bale chamber having a plurality of bale forming members, and an in-feed region for urging a crop material into the bale chamber to be formed into a bale by the bale forming members, the improvement comprising a material return device underlying the bale forming members, said material return device receiving reclaimable crop material passing through gaps in the bale forming members, and the in-feed region including a rotatable support drum that supports incoming crop material and feeds crop material over a top of the support drum into the bale forming chamber, an imperforate trough underlying the support drum, the material return device including structure positioned to guide reclaimable crop material toward the in-feed region to deposit reclaimable crop material in the imperforate trough, to be carried by the support drum to the bale chamber of the baler.

13. The baler improvement of claim 12 wherein the material return device comprises a panel underlying the plurality of belts and extending to the rear of the support drum, lengths of the belts closely overlying the panel to urge reclaimable crop material on the panel to the trough.

14. A reclaiming structure for mounting onto a baler forming round bales and having a bale forming apron made up of a plurality of bale forming belts that have gaps between the bale forming belts in a transverse direction, said structure comprising a panel positioned below the bale forming belts and receiving material dropping through the gaps, said panel being spaced from portions of the bale forming belts, which belt portions move the material dropping through the gaps toward an in-feed region of the baler, the baler having a pick up for picking up a stream of crop material, and rollers for guiding the stream of crop material into a bale forming chamber, one of the rollers comprising a drum on the lower side of the stream of crop material, a trough below the drum for supporting material on an underside of the drum in position to being engaged by the drum and carried with the drum to the bale forming chamber, and the panel being positioned so material moved off an end of the panel is deposited into the trough.

15. An improvement for a baler used for forming crop material into a bale and having a bale forming chamber, said bale forming chamber having a plurality of bale forming members, and an infeed region to the bale forming chamber including a rotating drum for urging crop material into the bale forming chamber, the bale forming chamber being spaced above portions of the baler, the improvement comprising a material return conveyor assembly mounted on the baler below the bale forming chamber, and including conveyor members for moving reclaimable material that drops from the bale forming chamber from a rearward portion of the baler to the infeed region of the baler, and guide walls to guide the reclaimable material moved by the conveyor member to be carried by the rotating drum with in-feed crop material into the bale forming chamber.

16. The improvement of claim 15 said conveyor members include a first conveyor portion that moves material across the width of the baler to a lateral side thereof, a second conveyor portion for elevating material moved by the first conveyor portion upwardly to a location above the material being fed into the baler, and a third conveyor portion for moving material from said second conveyor portion to the infeed region and into the bale chamber.

17. The improvement of claim 16, wherein the first and third conveyors are powered to rotate and convey material in opposite directions.

* * * * *